US008915320B2

(12) United States Patent
Chinta

(10) Patent No.: US 8,915,320 B2
(45) Date of Patent: Dec. 23, 2014

(54) VARIABLE ACTUATION RATE SHUTTER LOUVERS

(75) Inventor: Balakrishna Chinta, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 328 days.

(21) Appl. No.: 13/272,422

(22) Filed: Oct. 13, 2011

(65) Prior Publication Data

US 2013/0092462 A1 Apr. 18, 2013

(51) Int. Cl.
B60K 11/08 (2006.01)

(52) U.S. Cl.
CPC ..................... B60K 11/08 (2013.01)
USPC .......... 180/68.1; 180/68.4; 180/68.6

(58) Field of Classification Search
USPC .......... 180/68.1, 68.4, 68.6; 49/80.1; 165/98;
454/143, 145, 146, 148, 149, 278
See application file for complete search history.

(56) References Cited

U.S. PATENT DOCUMENTS

| | | | | |
|---|---|---|---|---|
| 1,220,794 | A * | 3/1917 | Stephenson | 165/98 |
| 1,480,095 | A * | 1/1924 | Moller | 165/98 |
| 1,706,338 | A * | 3/1929 | Workman | 49/80.1 |
| 1,737,946 | A * | 12/1929 | Rood | 49/80.1 |
| 1,858,289 | A * | 5/1932 | Tracy | 49/80.1 |
| 1,891,485 | A * | 12/1932 | Tracy | 49/80.1 |
| 2,090,908 | A * | 8/1937 | Anderson | 49/77.1 |
| 2,276,279 | A * | 3/1942 | Asklund | 180/68.1 |
| 2,310,086 | A * | 2/1943 | Howard | 165/86 |
| 2,419,635 | A * | 4/1947 | Faulkner | 49/371 |
| 2,743,796 | A * | 5/1956 | Focht, Jr. et al. | 49/80.1 |
| 2,770,851 | A * | 11/1956 | Soule | 49/80.1 |
| 2,901,961 | A * | 9/1959 | Cotts | 49/77.1 |
| 4,203,566 | A * | 5/1980 | Lord | 244/57 |
| 5,141,026 | A | 8/1992 | Collette | |
| 5,732,666 | A * | 3/1998 | Lee | 123/41.05 |
| 5,769,709 | A * | 6/1998 | Kim | 454/318 |
| 7,178,291 | B2 * | 2/2007 | Vasquez | 49/82.1 |
| 7,757,643 | B2 * | 7/2010 | Harich et al. | 123/41.04 |
| 7,766,111 | B2 | 8/2010 | Guilfoyle et al. | |
| 8,091,668 | B2 * | 1/2012 | Amano et al. | 180/68.1 |
| 8,136,487 | B2 * | 3/2012 | Bernt et al. | 123/41.05 |
| 8,161,919 | B2 * | 4/2012 | Klotz et al. | 123/41.04 |
| 8,443,921 | B2 * | 5/2013 | Charnesky et al. | 180/68.1 |
| 8,469,128 | B2 * | 6/2013 | Van Buren et al. | 180/68.1 |
| 8,473,164 | B2 * | 6/2013 | Charnesky et al. | 701/49 |
| 8,485,296 | B2 * | 7/2013 | Charnesky et al. | 180/68.1 |
| 8,505,660 | B2 * | 8/2013 | Fenchak et al. | 180/68.1 |
| 8,517,130 | B2 * | 8/2013 | Sakai | 180/68.1 |
| 8,544,581 | B2 * | 10/2013 | Stokes et al. | 180/68.1 |

(Continued)

FOREIGN PATENT DOCUMENTS

| | | |
|---|---|---|
| CN | 2272044 Y | 1/1998 |
| DE | 3836374 A1 | 1/1990 |

(Continued)

Primary Examiner — Katy M Ebner
(74) Attorney, Agent, or Firm — Quinn Law Group, PLLC

(57) ABSTRACT

A shutter system for controlling a flow of fluid through an entryway includes a plurality of louvers, wherein each louver includes a pivot axis and an actuating portion. The shutter system also includes a mechanism configured to select a position for the system between and inclusive of fully opened and fully closed by rotating each of the plurality of louvers about the respective pivot axis. The mechanism is configured to engage each actuating portion and rotate each louver at a variable rate. A vehicle employing the shutter system is also disclosed.

18 Claims, 4 Drawing Sheets

(56) References Cited

U.S. PATENT DOCUMENTS

| | | | |
|---|---|---|---|
| 8,561,738 B2 * | 10/2013 | Charnesky et al. | 180/68.1 |
| 2006/0060401 A1 * | 3/2006 | Bole | 180/68.1 |
| 2009/0050385 A1 * | 2/2009 | Guilfoyle et al. | 180/68.1 |
| 2010/0243352 A1 * | 9/2010 | Watanabe et al. | 180/68.1 |

FOREIGN PATENT DOCUMENTS

| | | |
|---|---|---|
| DE | 102006001797 A1 | 7/2007 |
| DE | 112007001053 B4 | 9/2012 |
| EP | 0925983 A1 | 6/1999 |

* cited by examiner

VARIABLE ACTUATION RATE SHUTTER LOUVERS

TECHNICAL FIELD

The disclosure relates to variable actuation rate louvers in an adjustable position shutter.

BACKGROUND

A shutter is typically a solid and stable covering for an opening. A shutter frequently consists of a frame and louvers or slats mounted within the frame.

Louvers may be fixed, i.e., having a permanently set angle with respect to the frame. Louvers may also be operable, i.e., having an angle that is adjustable with respect to the frame for permitting a desired amount of light, air, and/or liquid to pass from one side of the shutter to the other. Depending on the application and the construction of the frame, shutters can be mounted to fit within, or to overlap the opening. In addition to various functional purposes, particularly in architecture, shutters may also be employed for largely ornamental reasons.

SUMMARY

A shutter system for controlling a flow of fluid through an entryway includes a plurality of louvers, wherein each louver includes a pivot axis and an actuating portion. The shutter system also includes a mechanism configured to select a position for the system between and inclusive of fully opened and fully closed by rotating each of the plurality of louvers about the respective pivot axis. The mechanism is configured to engage each actuating portion and rotate each louver at a variable rate.

The mechanism may include a plurality of channels, wherein each of the plurality of channels may be configured to engage the actuating portion of a respective one of the plurality of louvers. Each of the plurality of channels may be characterized by a non-linear shape. Additionally, the shape of each of the plurality of channels may be distinct from the shape of every other of the plurality of channels.

Each of the plurality of channels may rotate a respective louver at a distinct rate relative to the rate of each of the other of the plurality of louvers.

Each actuating portion may include a roller configured to engage a respective channel.

The plurality of louvers may be arranged substantially one above the other and may include a top, intermediate, and bottom louver. In such a case, the top louver may be rotated by the mechanism from the fully closed to the fully opened position at a slower rate relative to the rate of the intermediate louver. Also, the intermediate louver may be rotated by the mechanism from the fully closed to the fully opened position at a slower rate relative to the rate of the bottom louver. Additionally, the bottom louver may commence being opened prior to the instance when the intermediate louver commences being opened, and the intermediate louver may commence being opened prior to the instance when the top louver commences being opened.

Furthermore, the top louver may be rotated by the mechanism from the fully opened to the fully closed position at a faster rate relative to the rate of the intermediate louver. Also, the intermediate louver may be rotated by the mechanism from the fully opened to the fully closed position at a faster rate relative to the rate of the bottom louver. Moreover, the top louver may commence being closed prior to the instance when the intermediate louver commences being closed, and the intermediate louver may commence being closed prior to the instance when the bottom louver commences being closed.

The shutter system may further include a controller configured to regulate the mechanism.

The entryway may be a grille opening in a vehicle having an internal combustion engine. In such a case, the controller may be configured to regulate the mechanism according to a load on the engine.

The engine may be cooled by a liquid circulated through a heat exchanger, and the vehicle may include a sensor to sense a temperature of the liquid and configured to communicate the temperature to the controller. The controller may be configured to regulate the mechanism to cool the liquid circulated through the radiator according to the sensed temperature of the liquid.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
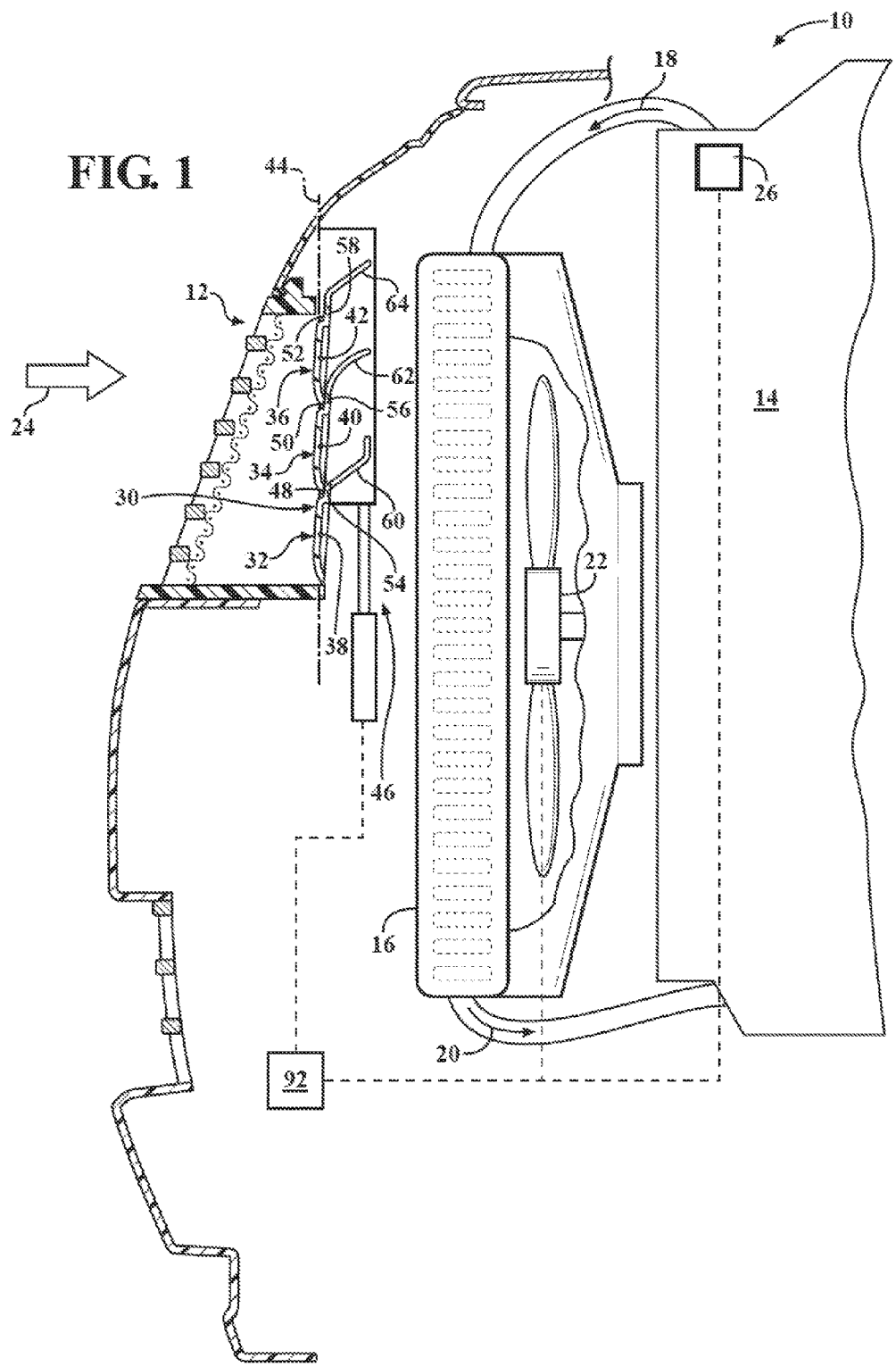
FIG. 1 is a partial side view of a vehicle employing a shutter system having rotatable louvers actuated by a mechanism, with the louvers being depicted in a fully closed state.
Figure 2:
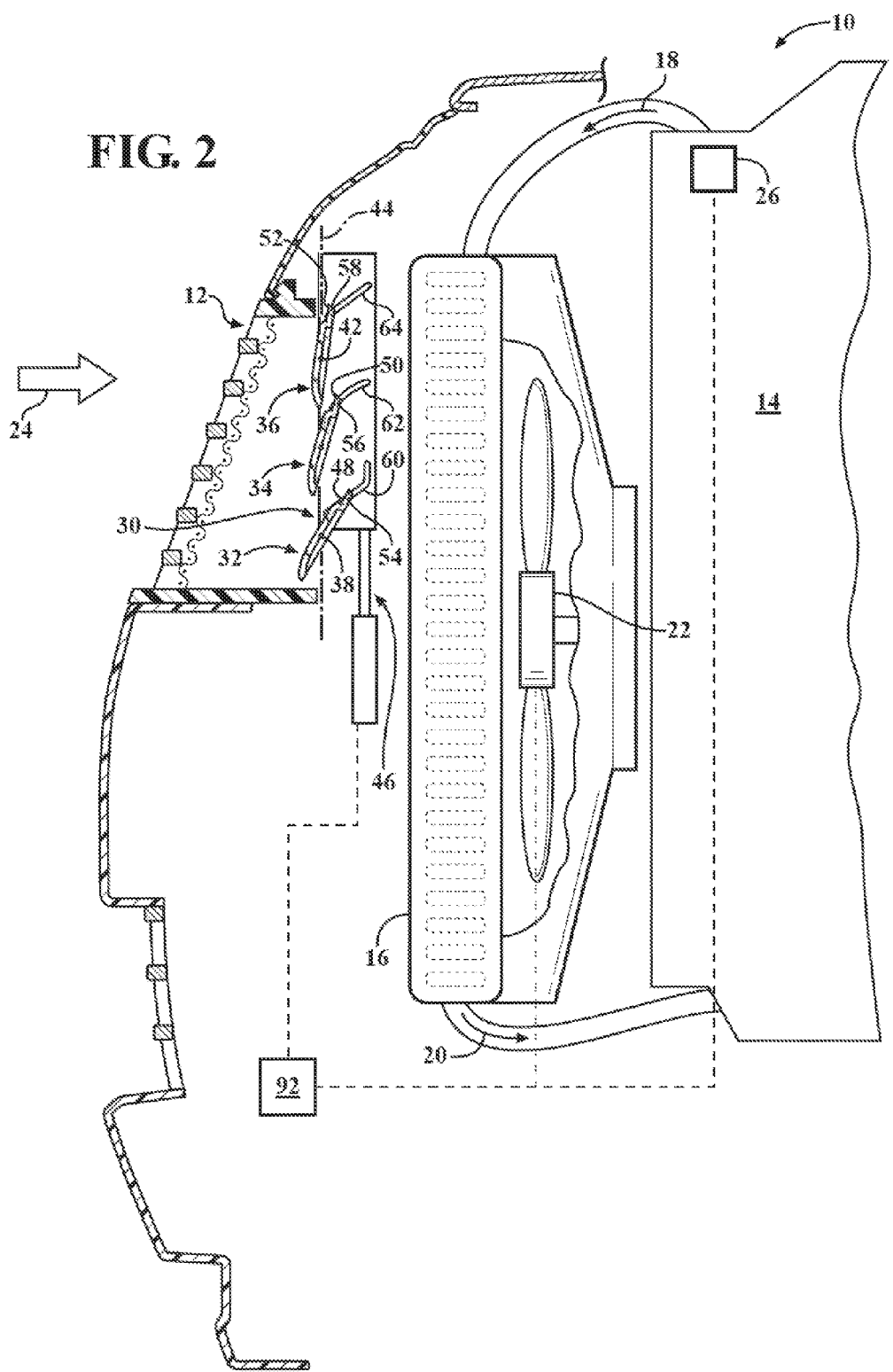
FIG. 2 is a partial side view of a vehicle employing the shutter system shown in FIG. 1, with the louvers being depicted in an intermediate state.
Figure 3:
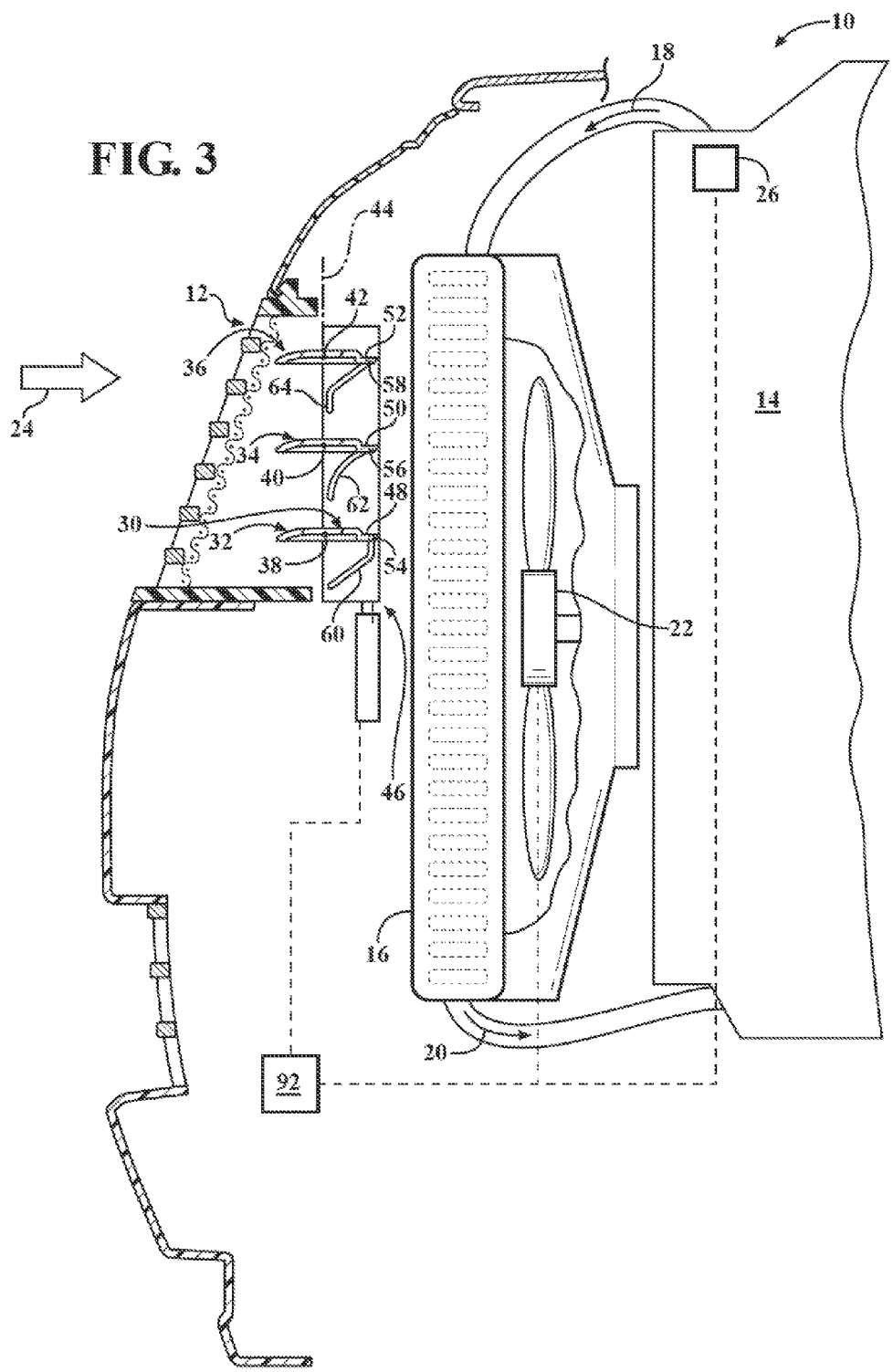
FIG. 3 is a partial side view of a vehicle employing the shutter system shown in FIGS. 1 and 2, with the louvers being depicted in a fully opened state.

Referring to the drawings, wherein like reference numbers refer to like components, FIGS. 1-3 show a partial side view of a vehicle 10. The vehicle 10 is shown to include a grille opening 12 of the type typically covered with a mesh. The grille opening 12 is an entryway into the vehicle 10, and is adapted for receiving ambient air. The vehicle 10 additionally includes a powertrain that is specifically represented by an internal combustion engine 14. The powertrain of the vehicle 10 may additionally include a transmission, and, if the vehicle is a hybrid type, one or more motor-generators, none of which is shown, but the existence of which can be appreciated by those skilled in the art. Efficiency of a vehicle powertrain is generally influenced by its design, as well as by the various loads seen by the powertrain during its operation. Such loads typically drive up temperatures of the powertrain and necessitate appropriate cooling to sustain reliable performance thereof.

The vehicle 10 additionally includes an air-to-liquid heat exchanger 16, i.e., a radiator, for circulating a cooling liquid shown by arrows 18 and 20, such as water or a specially formulated coolant, through the engine 14 to remove heat from the engine. A high-temperature coolant entering the heat exchanger 16 is represented by the arrow 18, and a reduced-temperature coolant being returned to the engine is represented by the arrow 20. The heat exchanger 16 is positioned behind the grille opening 12 for protection of the heat exchanger from various road- and air-borne debris. The heat exchanger 16 may also be positioned in any other location, such as behind a passenger compartment, if, for example, the vehicle has a rear or a mid-engine configuration, as understood by those skilled in the art.

As shown in FIGS. 1-3, a fan 22 is positioned in the vehicle 10, behind the heat exchanger 16, such that the heat exchanger 16 is positioned between the grill opening 12 and the fan. The fan 22 is capable of being selectively turned on and off based on the cooling needs of the engine 14. Depending on the road speed of the vehicle 10, fan 22 either generates or enhances a flow of air or airstream 24 through the grille opening 12, and toward and through the heat exchanger 16. Thus generated or enhanced through the action of the fan 22, the airstream 24 is passed through the heat exchanger 16 to remove heat from the high-temperature coolant 18 before the reduced-temperature coolant 20 is returned to the engine 14. The fan 22 may be driven either electrically, or mechanically, directly by the engine 14. The vehicle 10 additionally includes a coolant sensor 26 configured to sense a temperature of the high-temperature coolant 18 as it exits the engine 14.

FIGS. 1-3 also depict a shutter system 30. The shutter system 30 is secured in the vehicle 10 and is adapted to control airstream 24 through the grille opening 12. The shutter system 30 is positioned behind the grille opening 12 at the front of the vehicle 10. As shown, the shutter system 30 is positioned between the grille opening 12 and the heat exchanger 16. The shutter system 30 may also be incorporated into and be integral with the grille opening 12. The shutter system 30 includes a plurality of rotatable or adjustable louvers, herein shown as having three individual louvers, a bottom louver 32, an intermediate louver 34, and a top louver 36. Although three individual louvers 32, 34, and 36 are shown, the number of louvers may either be fewer or greater.

Each louver 32, 34, and 36 is configured to rotate about a respective pivot axis 38, 40, and 42 during operation of the shutter system 30, thereby effectively controlling the size of the grille opening 12. The shutter system 30 is adapted to operate between and inclusive of a fully closed position or state (as shown in FIG. 1), through an intermediate or partially opened position (as shown in FIG. 2), and to a fully opened position (as shown in FIG. 3). When the louvers 32, 34, and 36 are in any of their non-closed positions, the airstream 24 penetrates a plane 44 of the shutter system 30, as defined by the pivot axes 38, 40, and 42, before coming into contact with the heat exchanger 16. As shown, the louvers 32, 34, and 36 may be arranged substantially one above the other at the front of the vehicle 10 such that the airstream 24 is effectively square to the plane 44 of the shutter system 30.

The shutter system 30 also includes a mechanism 46 configured to select and lock a desired position for the shutter system between and inclusive of the fully opened and fully closed. The mechanism 46 is configured to cause the louvers 32, 34, 36 to rotate about their respective pivot axes 38, 40, and 42 to any of the available positions. The mechanism 46 may be configured to infinitely vary the position of the louvers 32, 34, 36 between and inclusive of the fully opened and fully closed, and to select and lock any discrete position of the louvers. The mechanism 46 acts to select the desired position for the louvers 32, 34, 36, when the mechanism is activated by any external means, such as an electric motor (not shown).

Each louver 32, 34, 36 includes a respective actuating portion, shown as projections 48, 50, and 52. Each projection 48, 50, and 52 includes a respective roller 54, 56, and 58. The mechanism 46 includes a plurality of channels, shown in FIGS. 1-4 as channel 60, channel 62, and channel 64. Channel 60 is configured to engage roller 54, channel 62 is configured to engage roller 56, and channel 64 is configured to engage roller 58. The mechanism 46 along with the channels 60, 62, and 64 is configured to be displaced substantially parallel to the plane 44 of the shutter system 30, and thus rotate the louvers 32, 34, 36. Accordingly, the rollers 54, 56, and 58 are configured to reduce friction at the interface between the channels 60, 62, and 64 and the projections 48, 50, and 52 during actuation of the shutter system 30 and the attendant rotation of the louvers 32, 34, 36.

Figure 4:
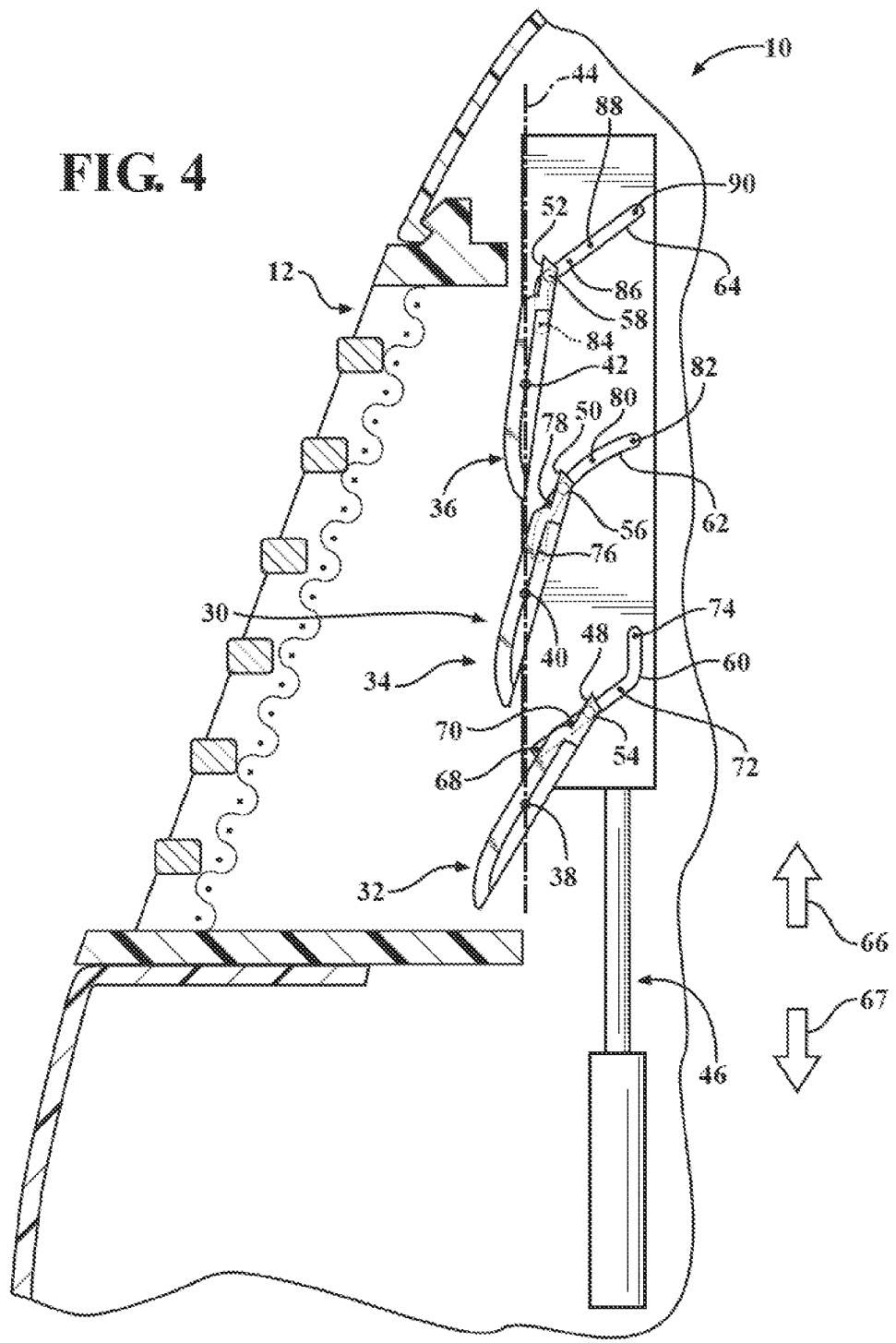
FIG. 4 is an enlarged view of the mechanism shown in FIGS. 1-3.

Each of the channels 60, 62, and 64 is characterized by a non-linear shape that is configured to rotate its respective louver 32, 34, 36 at a variable or changing rate as each roller 54, 56, and 58 follows its respective channel. As depicted in FIG. 4, the mechanism 46 is actuated in the direction identified by arrow 66 to open the louvers 32, 34, and 36 and ensure unrestricted passage of the airflow 24 through the grille opening 12. Additionally, the mechanism 46 is actuated in the direction identified by arrow 67 to close the louvers 32, 34, and 36 to block passage of the airflow 24 through the grille opening 12. As the mechanism 46 travels in the direction 66, the roller 54 follows the channel 60 from a position 68 where the bottom louver 32 is fully closed and rotates the bottom louver through positions 70 and 72, and on to position 74 where the bottom louver is fully opened. Also, while the mechanism 46 travels in the direction 66, the roller 56 follows the channel 62 from a position 76 where the intermediate louver 34 is fully closed and rotates the intermediate louver through positions 78 and 80, and on to position 82 where the intermediate louver is fully opened. Additionally, as the mechanism 46 travels in the direction 66, the roller 58 follows the channel 64 from a position 84 where the top louver 34 is fully closed and rotates the top louver through positions 86 and 88, and on to position 90 where the intermediate louver is fully opened.

With continued reference to FIG. 4, the channel 60 rotates the bottom louver 32 to open through the positions 68 and 70, while initially leaving the top louver 36 fully closed as shown by the positions 84 and 86 of the roller 58. The top louver 36 remains fully closed through the positions 84 and 86 of the roller 58 because the shape of the channel 64 through the positions 84 and 86 is substantially parallel to the direction 66. At the same time, the channel 62 rotates the intermediate louver 34 to open at a slower rate as compared with the bottom louver 32. As the mechanism 46 continues to travel in the direction 66, the roller 54 reaches the positions 72 and 74 where the bottom louver is fully opened and ceases to be rotated by the channel 60 because the shape of the channel 60 through the positions 72 and 74 is substantially parallel to the direction 66. At the same time, the intermediate louver 34 continues to be opened by the channel 62 through the positions 78 and 80 of the roller 56, while the top louver 36 begins to be opened through the positions 88 and 90 of the roller 58. In other words, the top louver 36 is rotated from the fully closed to the fully opened position at a slower rate relative to the rate of the intermediate louver 34, while the intermediate louver is rotated from the fully closed to the fully opened position at a slower rate relative to the rate of bottom louver 32.

When the mechanism 46 is actuated in the direction 67 to close the louvers 32, 34, and 36, the rate of rotation for each individual louver is reversed relative to their operation during operation in the direction 66. As the mechanism 46 begins to travel in the direction 67 to close the louvers 32, 34, 36, the bottom louver 32 remains fully opened through the positions 74 and 72 of the roller 54 because the shape of the channel 60 through the positions 72 and 74 is substantially parallel to the direction 67. The bottom louver 32 is then rotated through the positions 70 and 68 of the roller 54 into its fully closed state. Simultaneously, the intermediate louver 34 is progressively closed through the positions 82, 80, 78, and 76 of the roller 56. During the same time, the top louver 36 is initially rotated to close through the positions 90 and 88 of the roller 58. After reaching the position 88 of the roller 58, the top louver 36 achieves its fully closed state, and from there on through the positions 86 and 84 the rotation of the top louver is ceased, because the shape of the channel 64 through the positions 86 and 84 is substantially parallel to the direction 67. In other words, the top louver 36 is rotated from the fully opened to the fully closed position at a faster rate relative to the rate of the intermediate louver 34, while the intermediate louver is rotated from the fully opened to the fully closed position at a faster rate relative to the rate of bottom louver 32. Additionally, the channels 60, 62, and 64 may be configured such that the bottom louver commences being opened prior to the instance when the intermediate louver commences being opened, and the intermediate louver commences being opened prior to the instance when the top louver commences being opened. Accordingly, the shape of the channels 60, 62, 64 may permit the majority of the airstream 24 to penetrate the plane 44 of the shutter system 30 through the bottom louver 32 when the shutter system is in one of the partially opened positions (shown in FIG. 2).

In a moving vehicle 10, the airstream 24 travels at a certain velocity with respect to the vehicle and generates positive air pressure at the grille opening 12. Because the majority of the airstream 24 flows over the vehicle 10, the resistance to the airstream 24, and accordingly the aerodynamic drag of the vehicle, is typically higher at the grille opening 12 in the vicinity of the top louver 36 than in the vicinity of the bottom louver 32. Additionally, the resistance to the airstream 24 at the grille opening 12 diminishes progressively from the area near the top louver 36, through the area near the intermediate louver 34, and towards the bottom louver 32. Accordingly, the louvers 32, 34, 36 are rotated at a variable rate to address such distribution of aerodynamic loading at the grille opening 12. Specifically, and in line with the description provided above, the bottom louver 32 is rotated from its respective fully opened position to its fully closed position at a faster rate than the intermediate louver 34, and the intermediate louver 34 is rotated from its respective fully opened position to its fully closed position at a faster rate than the bottom louver 32. Additionally, the channels 60, 62, and 64 may be configured such that the top louver commences being closed prior to the instance when the intermediate louver commences being closed, and the intermediate louver commences being closed prior to the instance when the bottom louver commences being closed.

Overall, the shape of each of the plurality of channels 60, 62, and 64 is distinct from the shape of every other of the plurality of channels. Furthermore, each of the plurality of channels 60, 62, and 64 rotates its respective louver 32, 34, 36 at a distinct rate relative to the rate of each of the other of the plurality of louvers. The rates of rotation and, accordingly, the appropriate shapes of the channels 60, 62, and 64 may be determined and selected consistent with the specific aerodynamic signature of the vehicle 10. Such determination and selection of the appropriate shapes of the channels 60, 62, and 64 may be accomplished with the aid of calculations and finalized empirically during testing and development of the shutter system 30 and the vehicle 10.

As shown in FIGS. 1-3, the shutter system 30 additionally includes a controller 92, which may be a controller for the engine 14 or a separate control unit, configured to regulate the mechanism 46 for selecting the desired position of the louvers 32, 34, and 36. The controller 92 may also be configured to operate the fan 22, if the fan is electrically driven, and a thermostat (not shown) that is configured to regulate the circulation of coolant, as understood by those skilled in the art. The controller 92 is programmed to regulate the mechanism 46 according to the load on the engine 14 and, correspondingly, to the temperature of the coolant sensed by the sensor 26. The temperature of the high-temperature coolant 18 is increased due to the heat produced by the engine 14 under load. As known by those skilled in the art, an increased load on the engine 14 typically results from specific operating conditions imposed on the vehicle 10, such as going up a hill and/or pulling a trailer. Such increased load on the engine 14 generally drives up internal temperature of the engine, which in turn necessitates increased cooling of the engine for desired performance and reliability. Prior to exiting the engine 14, the coolant is routed inside the engine in order to most effectively remove heat from critical engine components, such as bearings (not shown, but known by those skilled in the art). Typically, the coolant is continuously circulated by a pump (not shown) between engine 14 and heat exchanger 16.

The fully closed position of the louvers 32, 34, 36 (as shown in FIG. 1) is selected by the controller 92 according to a programmed algorithm when powertrain cooling does not necessitate the airstream 24 to pass through the grille opening 12. Accordingly, in the fully closed position, the controller 92 regulates the mechanism 46 to ensure blockage of the airflow 24. The partially opened position of the louvers 32-36 (as shown in FIG. 2) is selected by the controller 92 according to a programmed algorithm when an intermediate level of powertrain cooling is demanded. Accordingly, in the partially opened position, the controller 92 regulates the mechanism 46 to partially restrict passage of the airflow 24 through the grille opening 12. The fully opened position of the louvers 32-36 (as shown in FIG. 3) is selected by the controller 92 according to a programmed algorithm when maximum powertrain cooling is required and an unrestricted amount of the airstream 24 must be passed through the grille opening 12. Accordingly, in the fully opened position, the controller 92 regulates the mechanism 46 to ensure unrestricted passage of the airflow 24 through the grille opening 12.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A shutter system for controlling a flow of fluid through an entryway, the shutter system comprising:
a plurality of louvers, including a top, intermediate, and bottom louver arranged substantially one above the other, each louver having a pivot axis and an actuating portion; and
a mechanism configured to select a position for the shutter system between and inclusive of fully opened and fully closed by rotating each of the plurality of louvers about the respective pivot axis;
wherein the mechanism is configured to engage each actuating portion and rotate each of the top, intermediate, and bottom louvers at distinct rates, and configured to commence rotating one of the top louver and the bottom louver prior to the instance when the intermediate louver commences being rotated, such that the bottom louver commences being opened prior to the instance when the intermediate louver commences being opened and the intermediate louver commences being opened prior to the instance when the top louver commences being opened.

2. The shutter system of claim 1, wherein the mechanism includes a plurality of channels, and wherein each of the plurality of channels is configured to engage the actuating portion of a respective one of the plurality of louvers.

3. The shutter system of claim 2, wherein each of the plurality of channels is characterized by a non-linear shape.

4. The shutter system of claim 3, wherein the shape of each of the plurality of channels is distinct from the shape of every other of the plurality of channels.

5. The shutter system of claim 4, wherein each of the plurality of channels rotates a respective louver at a distinct rate relative to the rate of each of the other of the plurality of louvers.

6. The shutter system of claim 1, wherein each actuating portion includes a roller configured to engage a respective channel.

7. The shutter system of claim 1, wherein the top louver commences being closed prior to the instance when the intermediate louver commences being closed, and the intermediate louver commences being closed prior to the instance when the bottom louver commences being closed.

8. The shutter system of claim 1, further comprising a controller configured to regulate the mechanism.

9. The shutter system of claim 8, wherein the entryway is a grille opening in a vehicle having an internal combustion engine, and the controller is configured to regulate the mechanism according to a load on the engine.

10. The shutter system of claim 9, wherein the engine is cooled by a liquid circulated through a heat exchanger, and the vehicle includes a sensor configured to sense a temperature of the liquid and communicate the temperature to the controller.

11. The shutter system of claim 10, wherein the controller is configured to regulate the mechanism to cool the liquid circulated through the heat exchanger according to the sensed temperature of the liquid.

12. A vehicle comprising:
an internal combustion engine cooled by a circulating fluid;
a heat exchanger configured to cool the liquid via an airstream after the liquid cools the engine;
a grille defining a grille opening positioned to permit the airstream to pass through on the way to the heat exchanger; and
a shutter system for controlling the airstream through the grille opening, the shutter system having:
a plurality of louvers, including a top, intermediate, and bottom louver arranged substantially one above the other, each louver having a pivot axis and an actuating portion;
a mechanism configured to select a position for the shutter system between and inclusive of fully opened and fully closed by rotating each of the plurality of louvers about the respective pivot axis; and
a controller configured to regulate the mechanism;
wherein the mechanism is configured to engage each actuating portion and rotate each of the top, intermediate, and bottom louvers at distinct rates, and configured to commence rotating one of the top louver and the bottom louver prior to the instance when the intermediate louver commences being rotated, such that the bottom louver commences being opened prior to the instance when the intermediate louver commences being opened and the intermediate louver commences being opened prior to the instance when the top louver commences being opened.

13. The vehicle of claim 12, wherein the mechanism includes a plurality of channels, and wherein each of the plurality of channels is configured to engage the actuating portion of a respective one of the plurality of louvers.

14. The vehicle of claim 13, wherein each of the plurality of channels is characterized by a non-linear shape.

15. The vehicle of claim 14, wherein the shape of each of the plurality of channels is distinct from the shape of every other of the plurality of channels.

16. The vehicle of claim 15, wherein each of the plurality of channels rotates a respective louver at a distinct rate relative to the rate of each of the other of the plurality of louvers.

17. The vehicle of claim 12, wherein each actuating portion includes a roller configured to engage a respective channel.

18. The vehicle of claim 12, wherein the top louver commences being closed prior to the instance when the intermediate louver commences being closed, and the intermediate louver commences being closed prior to the instance when the bottom louver commences being closed.

* * * * *